(12) United States Patent
Miani et al.

(10) Patent No.: US 8,425,832 B2
(45) Date of Patent: Apr. 23, 2013

(54) INJECTOR FOR ARC FURNACE

(75) Inventors: Stefano Miani, Udine (IT); Bruno Rubeo, Udine (IT)

(73) Assignee: Concast AG, Zurich (CH)

( * ) Notice: Subject to any disclaimer, the term of this patent is extended or adjusted under 35 U.S.C. 154(b) by 297 days.

(21) Appl. No.: 12/673,203

(22) PCT Filed: Sep. 13, 2007

(86) PCT No.: PCT/IT2007/000629
§ 371 (c)(1),
(2), (4) Date: Apr. 23, 2010

(87) PCT Pub. No.: WO2009/034586
PCT Pub. Date: Mar. 19, 2009

(65) Prior Publication Data
US 2010/0252967 A1    Oct. 7, 2010

(51) Int. Cl.
*C21B 7/16* (2006.01)
*C21B 7/10* (2006.01)

(52) U.S. Cl.
USPC .............................. 266/268; 266/46; 266/270

(58) Field of Classification Search .................. 266/255, 266/46, 270, 268, 226, 266, 267, 901, 225
See application file for complete search history.

(56) References Cited

U.S. PATENT DOCUMENTS

| | | | |
|---|---|---|---|
| 4,732,370 A | 3/1988 | Berry et al. | |
| 5,599,375 A * | 2/1997 | Gitman | 75/10.42 |
| 5,904,895 A * | 5/1999 | Gitman et al. | 266/225 |
| 6,212,218 B1 | 4/2001 | Shver | |
| 7,591,876 B2 * | 9/2009 | Cameron et al. | 75/530 |
| 7,998,133 B2 * | 8/2011 | Fago et al. | 604/533 |

FOREIGN PATENT DOCUMENTS

| | | |
|---|---|---|
| DE | 4123391 | 1/1992 |
| EP | 1170385 | 1/2002 |
| GB | 1070049 | 5/1967 |
| WO | 2005/005900 | 1/2005 |

* cited by examiner

*Primary Examiner* — Scott Kastler
(74) *Attorney, Agent, or Firm* — Shoemaker and Mattare (57) ABSTRACT

The present invention relates to an injector for an arc furnace. The injector comprises a head suitable to face into the furnace and a body suitable to support the head. The head and body are manufactured separately from each other, and are fastened by means of removable connection means in order to implement said injector.

29 Claims, 11 Drawing Sheets

FIG. 14

INJECTOR FOR ARC FURNACE

FIELD OF THE INVENTION

The object of the present invention is an injector for electric arc furnaces for steel melting.

BACKGROUND OF THE INVENTION

In the field of electric arc furnaces for use in the iron and steel industry, it is known to make openings on the side walls of the furnace chamber (or shaft). Devices (or injectors) such as auxiliary burners and/or lances can be inserted through these openings.

Particularly, it is known to use auxiliary burners that allow adding further amounts of heat to the heat provided by the electric arc in order to facilitate and accelerate metal bulk melting. It is also known to use dispensers that are capable of simultaneously injecting gases and powders into the shaft. By "lance" is normally meant a supersonic gas dispenser or a high-speed powder dispenser. Dispensers and lances, besides functioning as gas injectors or burners, allow introducing additives in the molten metal bath, which are used during the metallurgical process, such as coal, lime or powders.

Auxiliary burners, dispensers and lances will be referred to herein below as "injectors".

These injectors, in order to obtain maximum effectiveness, must be placed as deep within the furnace as possible, proximate to the molten bath. In this configuration, they are intended to operate at the furnace operating temperature, i.e. about 1500° C.-1700° C., and are further exposed to possible splashes of liquid steel and slag. These are very hard operating conditions, which cause the injector to be very rapidly worn.

Considerable wear levels of the injector can cause a water leakage from the cooling circuit within the furnace, with a consequent worsening in the operating conditions. Furthermore, any water infiltration below the layer of refractory material may cause the formation of vapour that results in a rapid volume and pressure increase having the effect of an actual explosion.

A water leakage at the furnace operating temperatures further involves a risk related to the cleavage of water into hydrogen and oxygen. This means a further risk of explosion.

Furthermore, the injector wear involves the risk that leakage may occur in the circuits of the fuel and/or oxidizer that are delivered into the furnace by the injector. In this case, fuel and oxidizer would no longer come to be admixed in the area arranged for combustion within the furnace, but would admix upstream of the injector thus causing, again, a serious risk of explosion.

From what has been stated above, it is thus understood how a ready replacement of the worn injector is important. As known injectors are composed by a structure made of steel and copper welded to each other, those skilled in the art will appreciate how a frequent replacement of the injectors negatively affects the operating costs of a furnace.

SUMMARY OF THE INVENTION

The object of the present invention is to provide an injector having such structural and functional characteristics as to at least partially overcome said drawbacks cited with reference to the prior art.

Particularly, the task of the present invention is to provide an injector that is configured such as to reduce the operating costs.

This object is achieved by means of an injector of the type described in claim 1.

BRIEF DESCRIPTION OF THE DRAWINGS

Further embodiments are described in the dependent claims.

Further characteristics and the advantages of the injector according to the invention will be apparent from the description below of several preferred embodiments thereof, which are merely illustrative and non-limiting, with reference to the annexed figures, in which.

DETAILED DESCRIPTION OF THE INVENTION

With reference to the annexed figures, with 1 has been generally designated an injector according to the invention.

Figure 1:
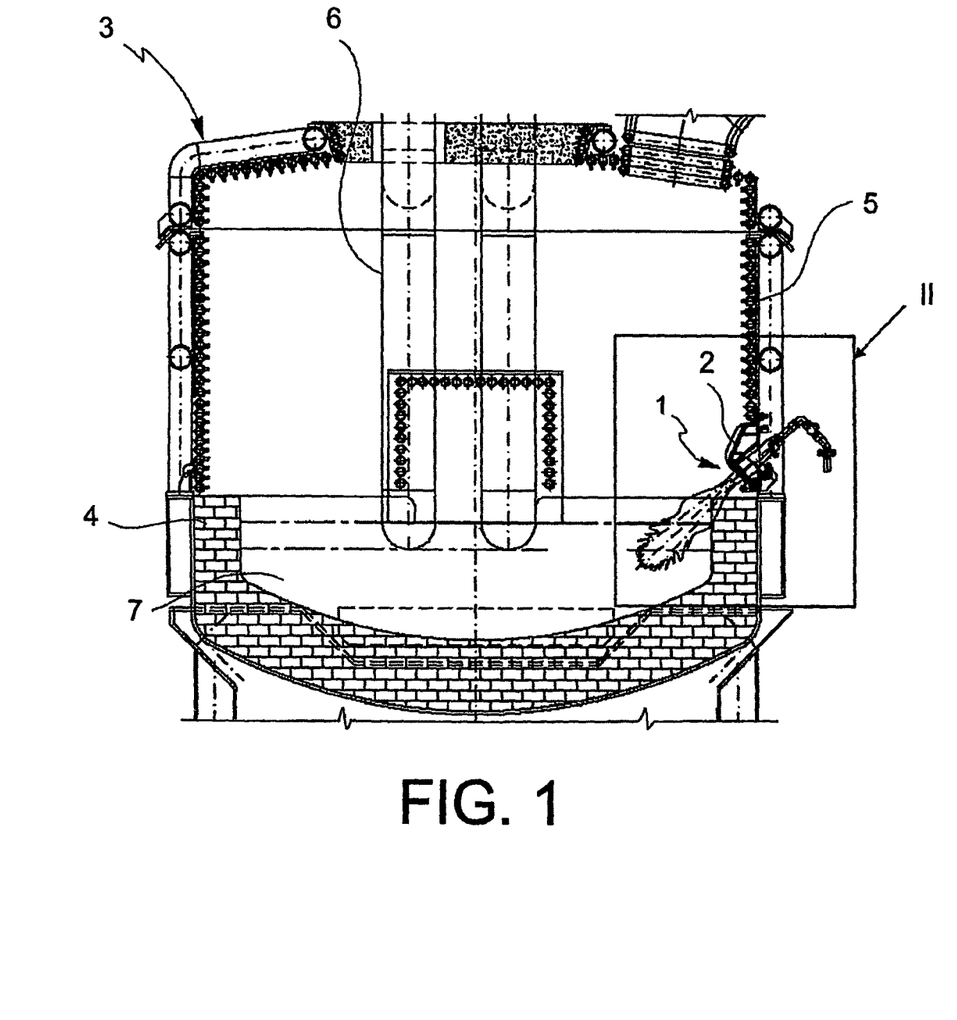
FIG. 1 illustrates the section of an electric arc furnace of a known type.
Figure 2:
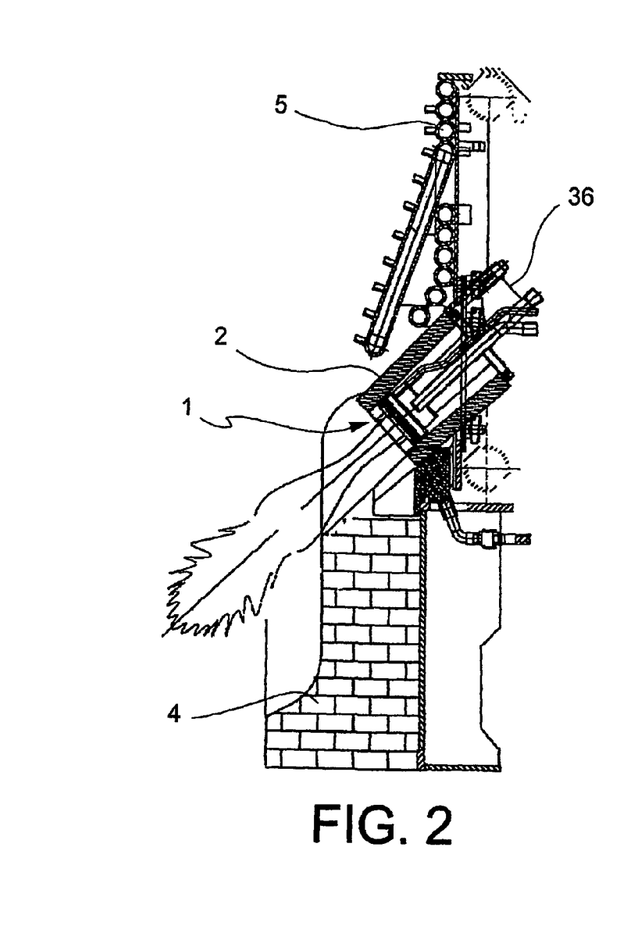
FIG. 2 illustrates the detail of a furnace similar to that referred to with II in FIG. 1 comprising an injector in accordance with the invention.

With particular reference to FIGS. 1 and 2, the injector 1, protected by a cooled case 2, is placed in an opening operated in the side wall of an arc furnace 3. In a manner known per se, the arc furnace 3 comprises an inner lining 4 made of refractory material, a cooling system 5, electrodes 6 and, upon operation, a molten metal bath 7.

The injector 1 according to the invention, comprises a head 10 and a body 20. The head is suitable to face into the arc furnace 3. The body 20 is suitable to support the head 10. The head 10 and body 20 are made separately from each other and are fastened by means of removable connection means 30 in order to implement the injector 1.

The embodiments of the injector 1 discussed below have a substantially axially symmetrical shape. For clarity purposes, the description herein below will refer to this shape, though it is nevertheless provided that an injector according to the invention may take other shapes in order to meet particular contingent requirements.

Figure 3:
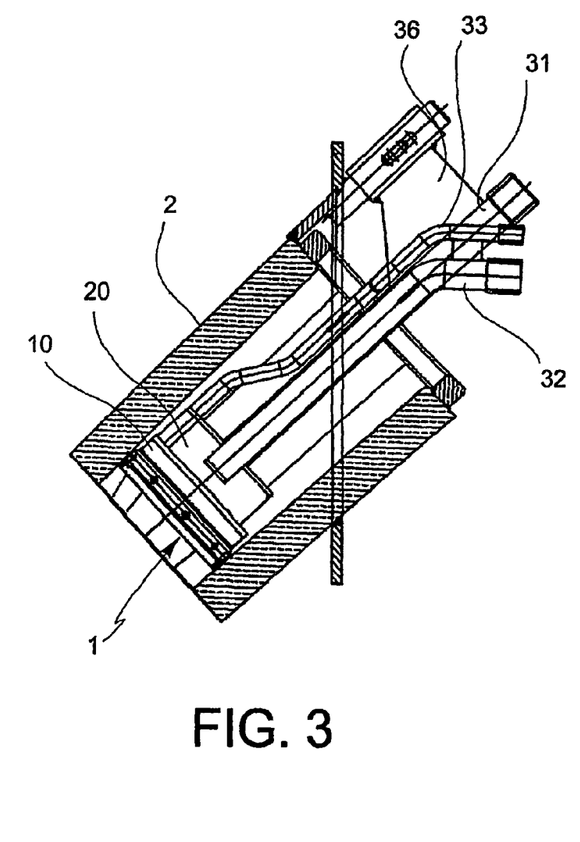
FIG. 3 illustrates a detail in FIG. 2 comprising an injector in accordance with the invention.
Figure 4:
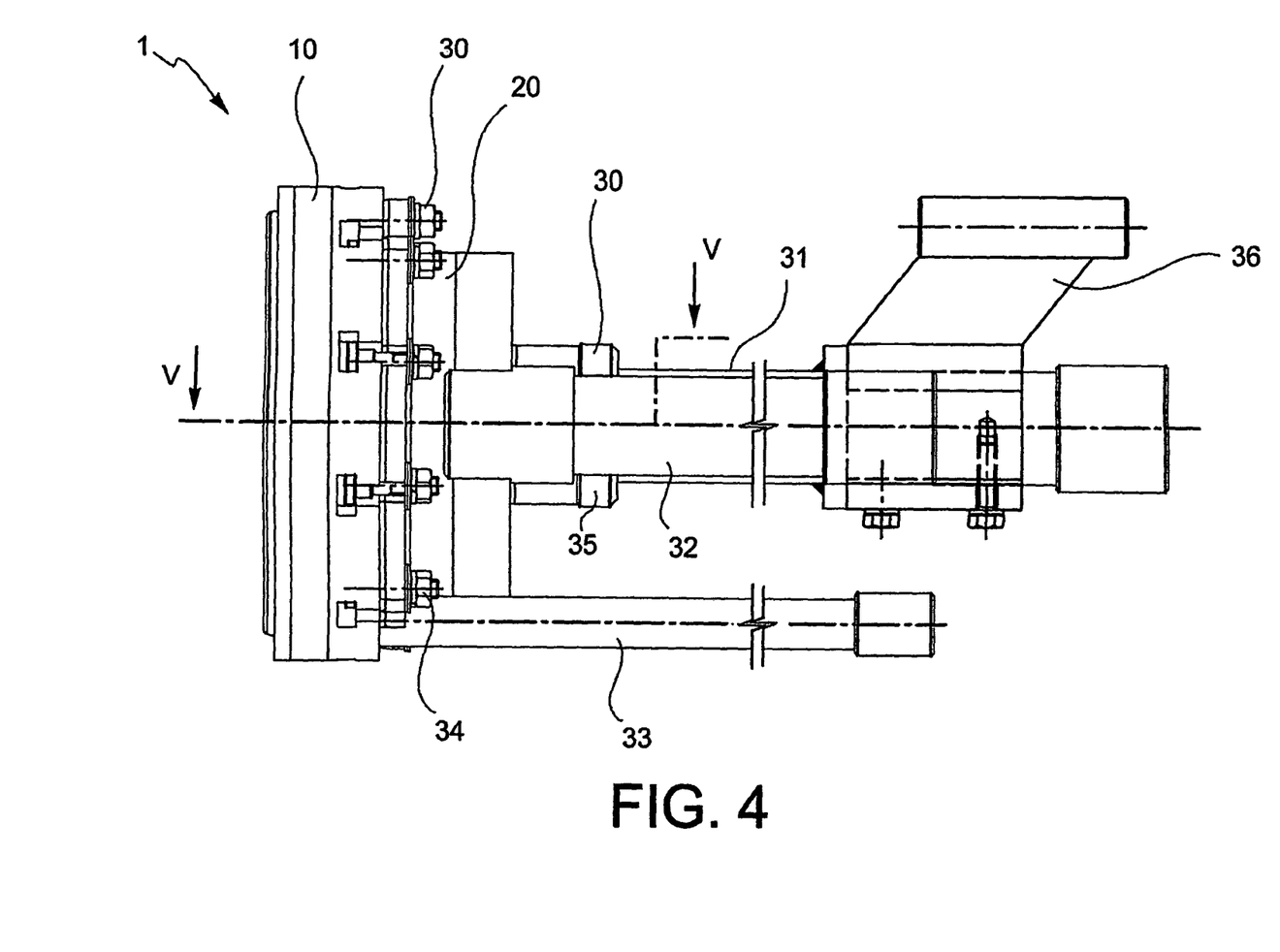
FIG. 4 illustrates a side view of an injector in accordance with the invention.

In accordance with the embodiment in FIG. 2 to 4, the injector 1 comprises means 36 for mounting the latter to the cooled case 2.

The head 10 is shaped, in a manner known per se, to effectively deliver substances into the furnace 3. These can be gaseous and/or powdered substances. Particularly, the head 10 typically, though not necessarily, comprises a central nozzle 11 and a series of toroidal chambers 12 that are co-axially arranged relative to each other and relative to the central nozzle 11.

Figure 5:
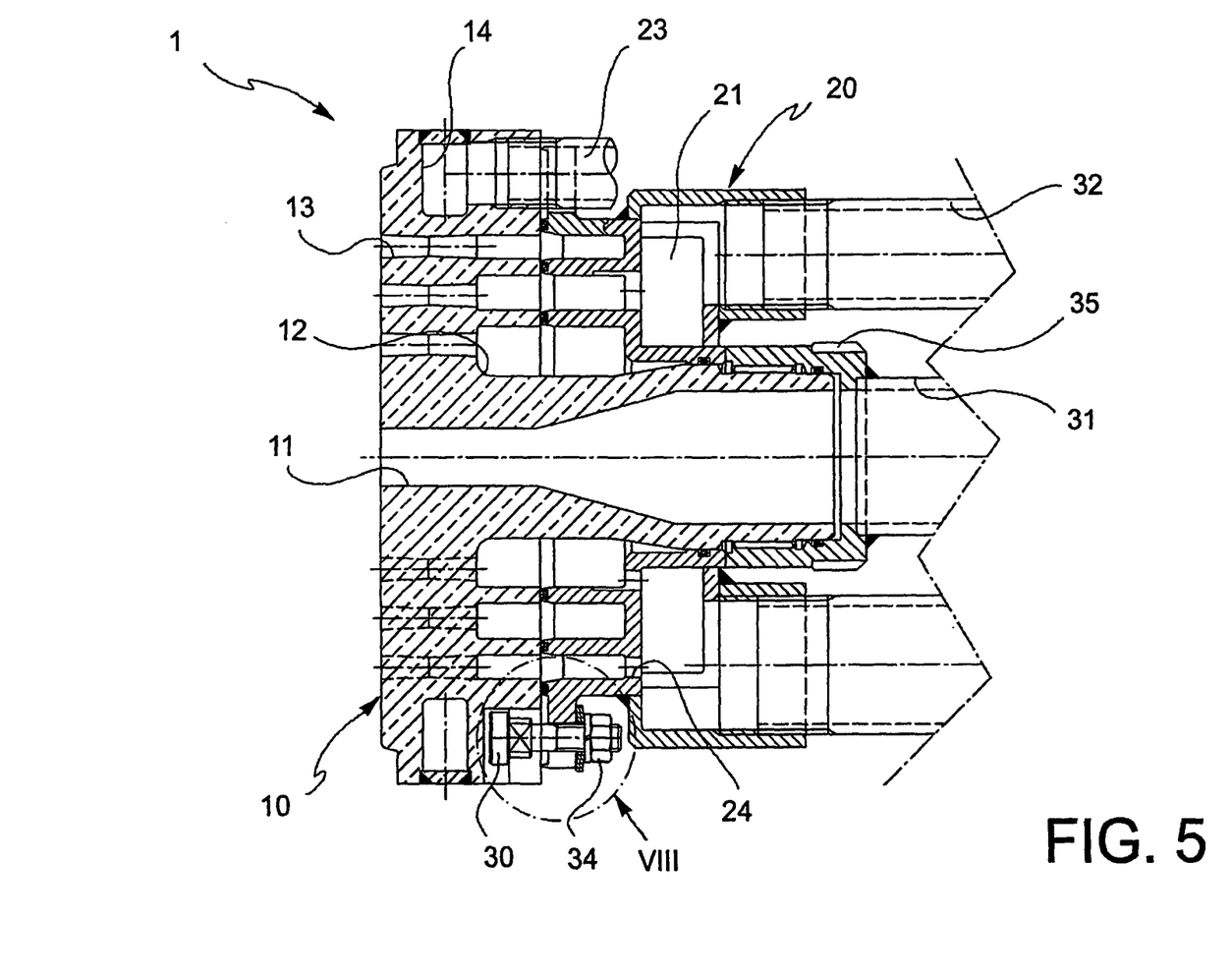
FIG. 5 illustrates a sectional view taken along the line V-V in FIG. 4.
Figure 6:
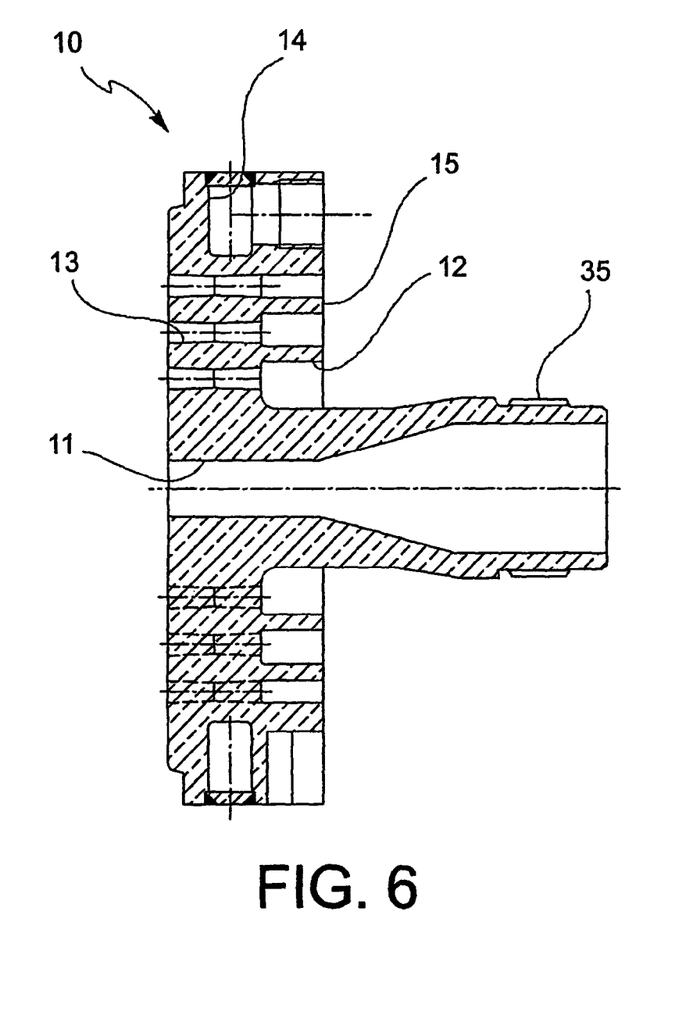
FIG. 6 illustrates a section of the head of an injector similar to that of FIG. 5.
Figure 7:
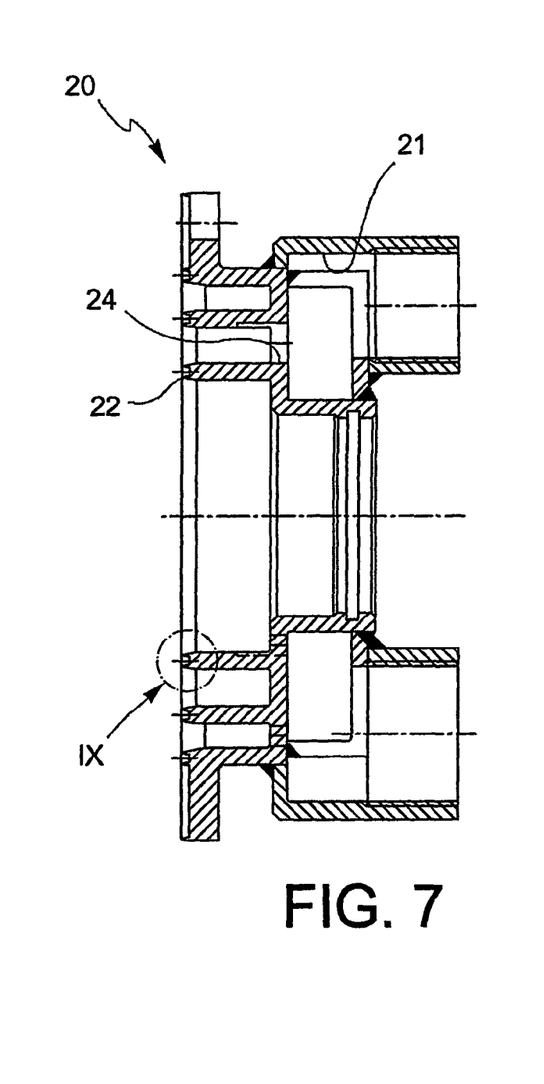
FIG. 7 illustrates a section of the body of an injector similar to that in FIG. 5.

The central nozzle 11 is preferably a De Laval nozzle suitable to output a supersonic flow to the furnace. Particularly, the central nozzle 11 illustrated in the annexed drawings (seen in FIGS. 5, 6 and 14) is designed to emit a supersonic oxygen flow or to inject powders being pneumatically carried with a gaseous means.

Each of the toroidal chambers 12 comprises a series of supply orifices 13 suitable to feed a gas and/or powder flow into the furnace in the vicinity of the central flow. The supply orifices 13 are preferably suitable to emit a flow even at higher speed than that of the central nozzle.

The number and spacing of the supply orifices 13 can change according to the particular requirements and can take various configurations, either axially symmetrical or not.

The gas delivery to the supply orifices 13 can be either even (axially symmetrical) or uneven (not axially symmetrical) and is mainly carried out within the body 20. The manner in which various gas deliveries can be obtained to the supply orifices 13 will be described below.

In accordance with an embodiment of the injector 1, the head 10 comprises a cooling circuit 14 suitable to contain the circulation of a cooling liquid, typically water.

In accordance with an embodiment of the injector 1, the body 20 comprises (not necessarily axially symmetrical) collectors 21 to supply the toroidal chambers 12 of the head 10. The fluid connection between the collectors 21 and the toroidal chambers 12 is described below.

In accordance with an embodiment, the injector 1 comprises connections suitable to the connection to supply circuits for the delivered substances and cooling liquid. Particularly, with reference to the figures, with 31 has been designated the supply circuit of the central nozzle 11, with 32 have been designated the supply circuits of the toroidal chambers 12 and with 33 has been designated the circuit of the cooling liquid of the head 10.

In accordance with an embodiment of the injector 1, the head 10 and body 20 are made of different materials. Preferably, the head is made of copper, whereas the body 20 is preferably made of stainless steel.

Alternatively, the head 10 can be made of a material other than the copper, provided that it has a high thermal conductivity and/or has high refractory characteristics so as to withstand the furnace operating temperature (even higher than 1700° C.) without dramatically impairing the mechanical characteristics. Similarly, the body 20 can be also made of a material other than stainless steel, provided that it has a high mechanical resistance.

It is further preferred that both materials have different hardness values. Particularly, the material composing the body 20 will be considered herein below as being harder than the material composing the head 10, even though the contrary may also apply under particular conditions.

The removable connection means 30 are capable of defining a constrained condition in which the head 10 and body 20 are firmly linked to each other. Furthermore, the removable connection means 30 are suitable to pass, for a preset indefinite number of times, from this constrained condition to a released condition in which the head 10 and body 20 are not linked to each other.

In accordance with the embodiments of the injector 1 being represented in the attached figures, the removable connection means 30 connecting the head 10 to the body 20 comprise a plurality of bolts 34, each of which comprising a screw and a nut.

These bolts 34 (see FIG. 8) are preferably configured such as to reduce upset effects, i.e. the deformation induced in the copper of head 10 by the clamping bolts 34. Particularly, the contact surface between the bolt 34 and head 10 is greater than that which would be obtained with a traditional bolt of the same size. In fact, instead of a traditional nut or a flat head screw, a wider metallic cylinder and a head with a tapered collar is used. A greater contact surface will be thus obtained between the copper bolt 34 and head 10.

Preferably, the removable connection members 30 comprise a further screw-nutscrew coupling 35 that is placed in the central area of the injector, such as about the central nozzle 11.

In accordance with an embodiment of the injector, the body 20 comprises, on that wall thereof facing the head 10 under operating conditions, a series of ridges 22. In a complementary manner, the head 10 comprises, on that wall thereof facing the body 20 under operating conditions, a series of flat tracks 15 arranged to match the ridges 22.

Figure 8:
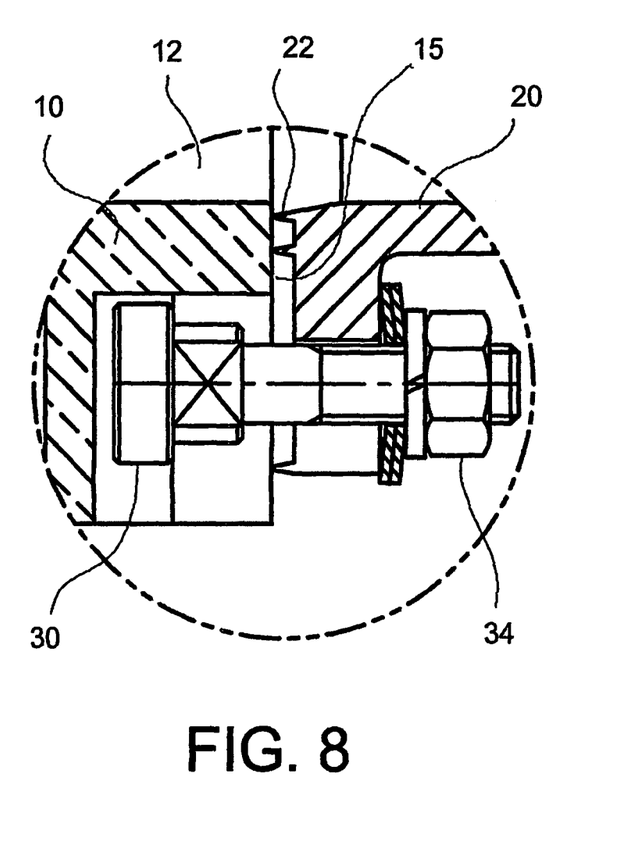
FIG. 8 illustrates the detail referred to with VIII in FIG. 5.
Figure 9:
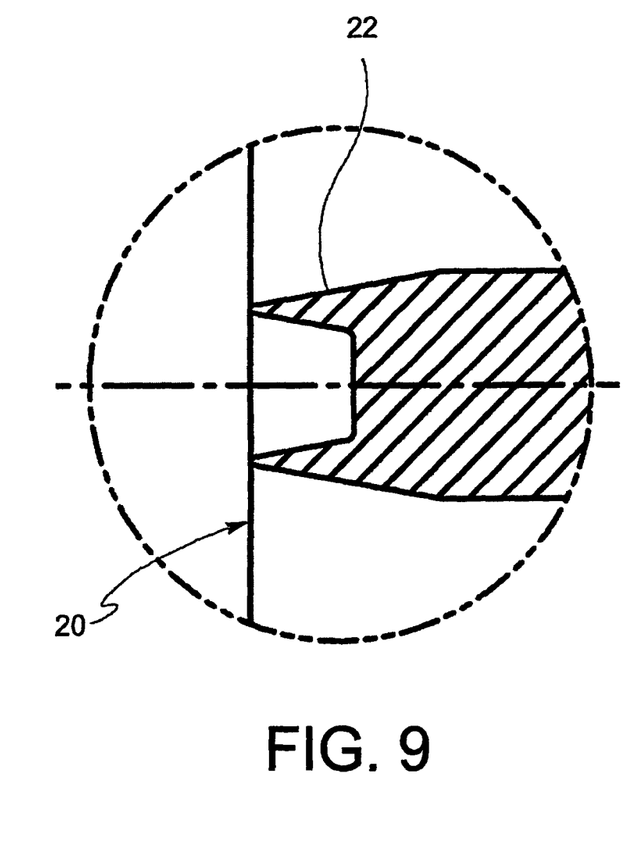
FIG. 9 illustrates the detail referred to with IX in FIG. 7.
Figure 10:
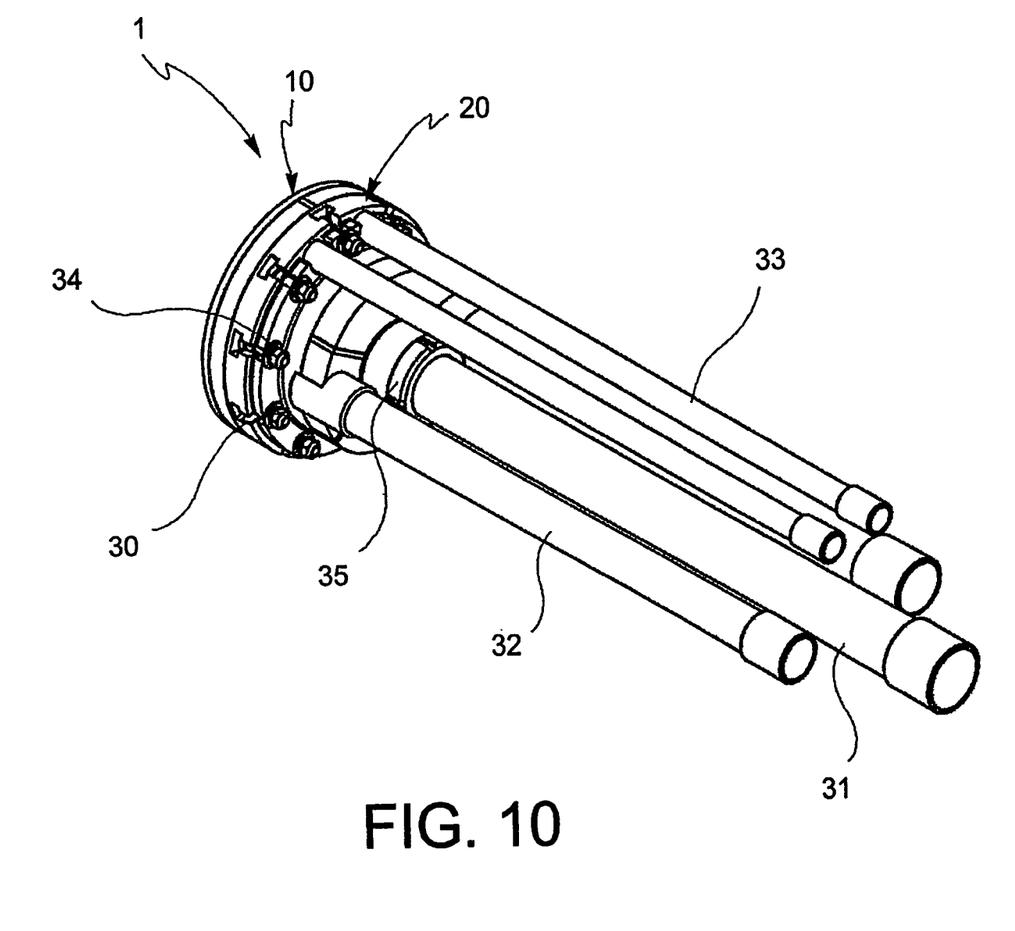
FIG. 10 illustrates a first perspective view of the injector according to the invention.
Figure 11:
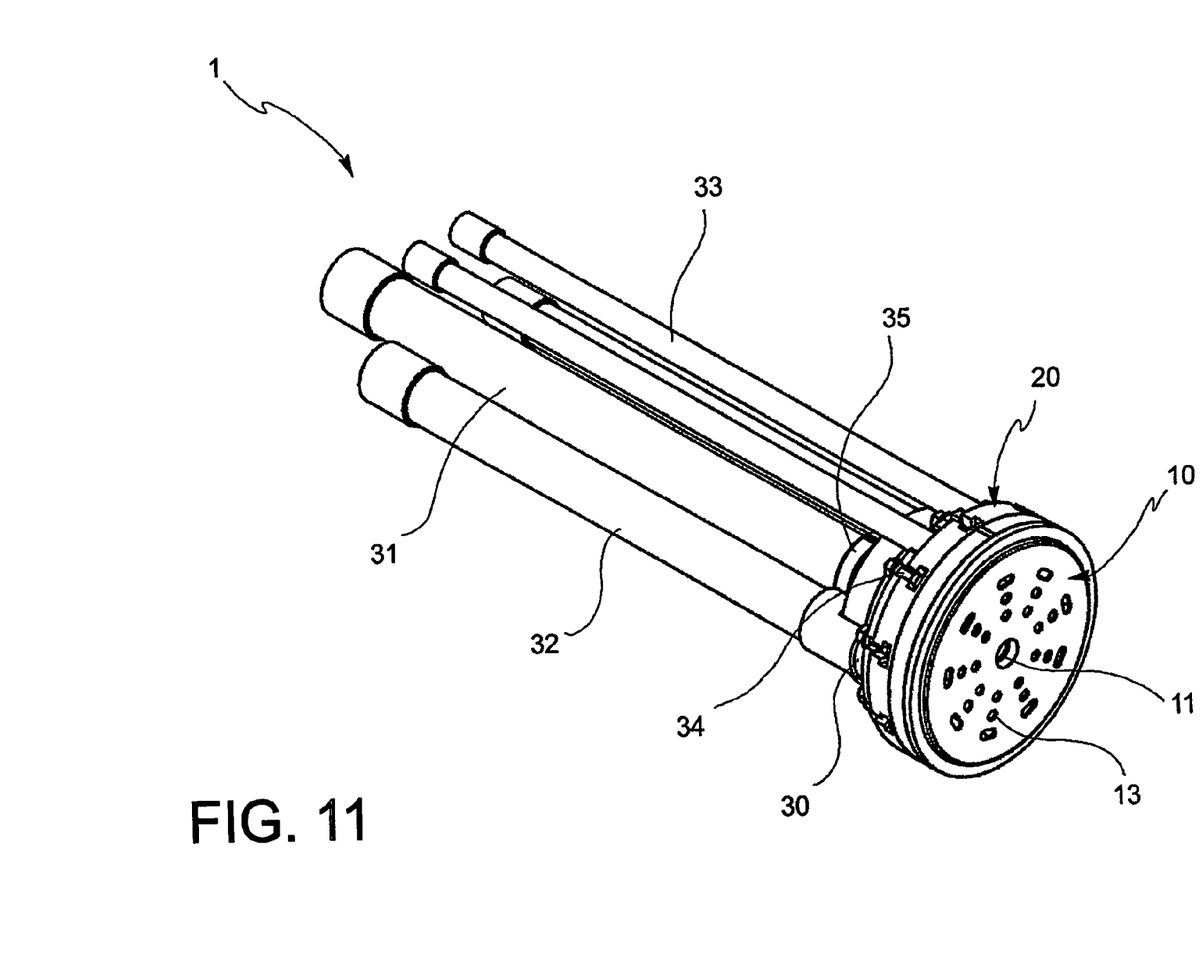
FIG. 11 illustrates a second perspective view of the injector according to the invention.
Figure 12:
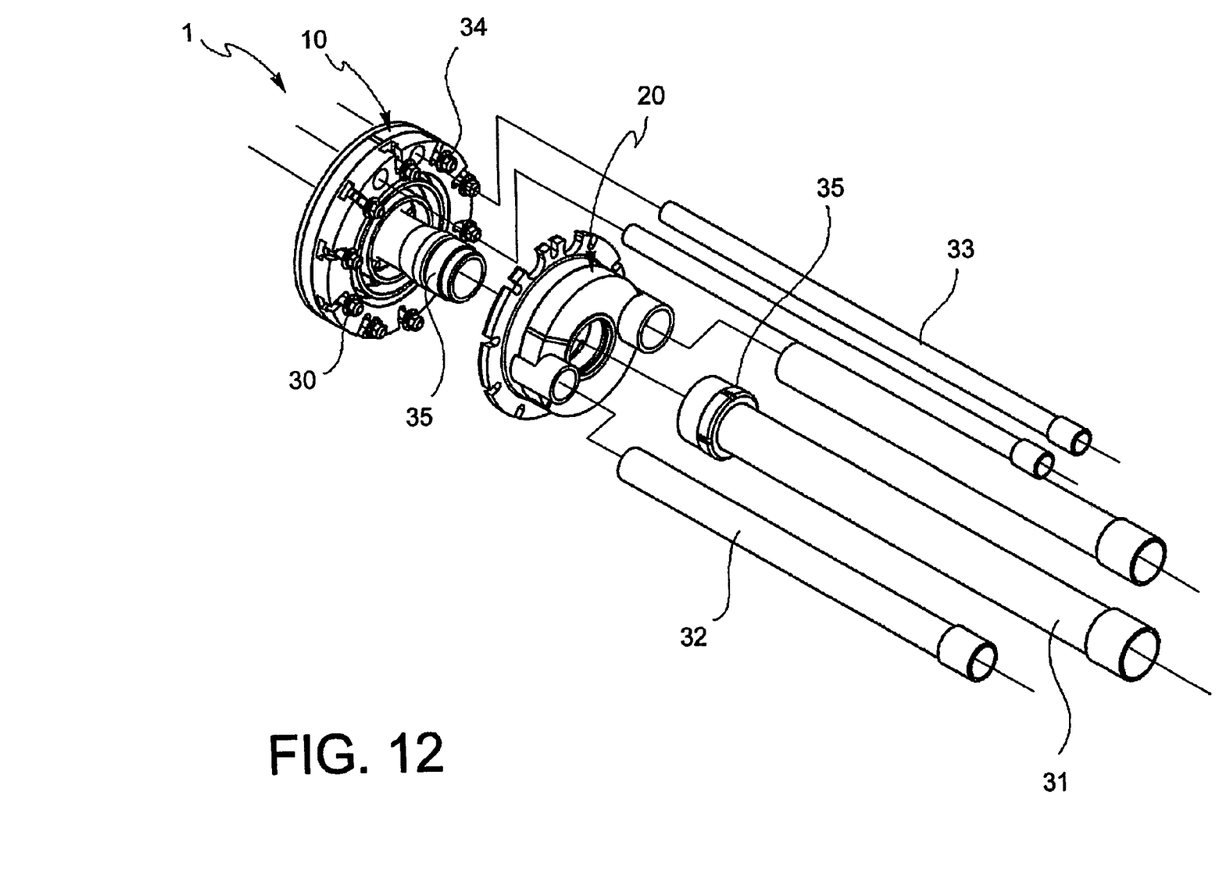
FIG. 12 illustrates a first perspective exploded view of the injector according to the invention.
Figure 13:
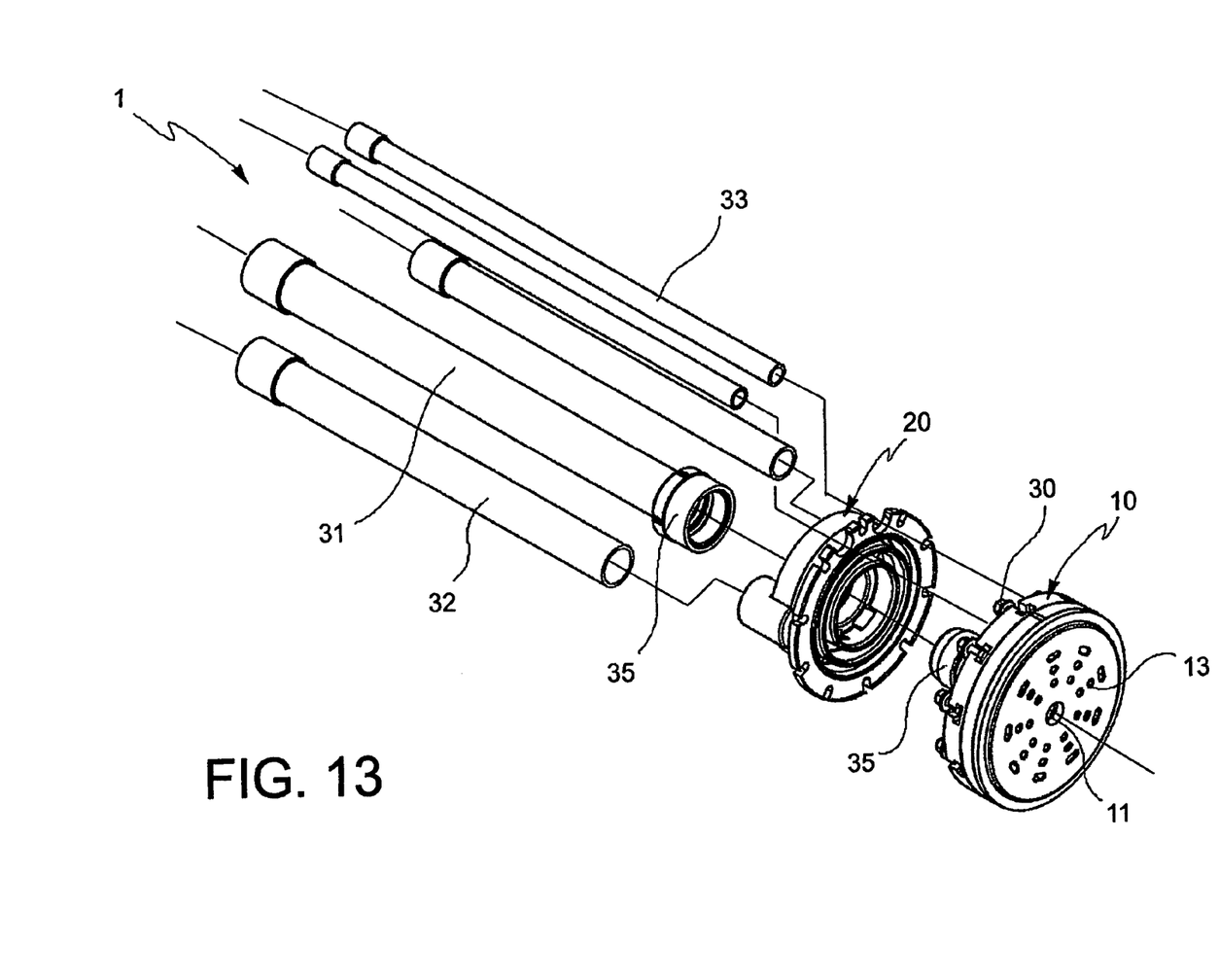
FIG. 13 illustrates a second perspective exploded view of the injector according to the invention.

The ridges 22 can be seen in the sections in FIGS. 8 and 9 and in the layout in FIG. 13. The flat tracks 15 can be seen in the section of FIG. 8 and in the layout in FIG. 12.

As may be seen in FIG. 9, the ridges are sharp-edged. In other words, their section is triangular or cusp-shaped, preferably it is double. Thereby, a contact surface between the body 20 and head 10 is obtained, which is substantially restrained to the line being defined by the vertex of the ridges 22 on the flat tracks 15.

The ridges 22 are suitable to define closed regions 23, which are preferably concentric to each other. Within these closed regions 23, the lumens 24 are arranged, which connect to each other the collectors 21 of the body 20 and toroidal chambers 12 of the head 10.

Due to the different hardness of the materials of the head 10 and body 20, configuration of the ridges 22 and clamping force given by the removable coupling means 30, the steel ridges 22 locally cause a plastic deformation in the copper surface of the flat tracks 15. Grooves are thus formed in the flat tracks 15 which are perfectly complementary with the ridges 22.

This technical characteristic allows obtaining that the regions 23 are sealed relative to each other and relative to the external environment. It should be noted that, under ideal conditions, this seal is obtained without using any gasket. Gaskets can be optionally provided to restore the sealing capacity in those injectors that lost it during the operating life, such as due to deformations occurred on the ridges 22 and/or flat tracks 15.

The possibility of selecting various spacing and sizes for the lumens 24 in the body 20 contributes to obtain various gas distributions to the toroidal chambers 12 of the head 1 and thus to the supply orifices 13.

In the embodiments described above, the central nozzle 11 is provided within the head 10. In accordance with other embodiments of the injector 1 (see for example FIG. 14), the central nozzle 11 is made by means of a tubular body 16 that is separated from the remaining part of the head 10.

Figure 14:
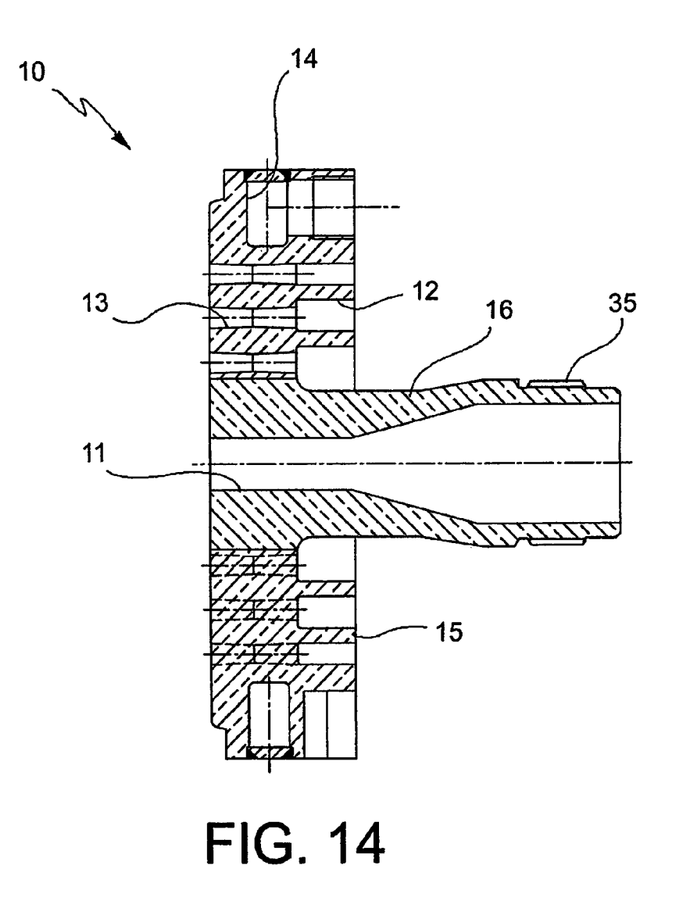
FIG. 14 illustrates a section of the head of an injector similar to that in FIG. 6.

This solution, while being a constructive complication, allows obtaining a number of advantages. First of all, the tubular body 16 can be made of a material other than that used for the head 10. This possibility is particularly useful when the nozzle walls 11 are exposed to excessive wear relative to the remaining part of the head 10.

Furthermore, for an individual head 10, various tubular bodies 16 can be available which are interchangeable with each other and have different central nozzles 11, with configurations that are adapted to different operating conditions.

From what has been discussed above, those skilled in the art will appreciate that the injector 1 according to the invention allows overcoming some of the drawbacks of the prior art.

Particularly, as the head 10 is the part of the injector 1 which is more exposed to wear, the possibility of replacing only the head 10 when worn determines a dramatic decrease in the maintenance costs.

Furthermore, the constraint between the head 10 and body 20 obtained by means of removable coupling means allows avoiding the use of complicated and expensive technologies, such as braze-welding, which are required for coupling different materials such as copper and steel.

It should be understood that variations and/or additions may be provided to what has been described and illustrated above. For example, it is understood to those skilled in the art that the injector according to the invention can be made with shapes other than that represented herein, for example with non-axially symmetrical shapes.

Generally, all the characteristics described above in relation with particular possible embodiments can be implemented independently from each other.

To the embodiments of the injector 1 described above, those skilled in the art, aiming at satisfying contingent and specific needs, may carry out a number of modifications, adaptations and replacements of elements with others functionally equivalent, without however departing from the scope of the claims below.

The invention claimed is:

1. An injector for an arc furnace, comprising a head suitable to face into the furnace and a body suitable to support the head, the head and the body being made separately from each other and being fastened by of a removable connection means in order to implement said injector, wherein
   the body comprises, on a contact surface facing the head under operating conditions, a series of sharp-edged steel ridges, and wherein
   the head comprises, on a contact facing the body under operating conditions, a series of flat tracks arranged to match the ridges, and
   the steel ridges locally induce a plastic deformation in a copper surface of the flat tracks when the removable connection means are tightened, such as to form grooves in the flat tracks which are perfectly complementary with the ridges.

2. The injector according to claim 1, comprising means for assembling to a cooled case.

3. The injector according to claim 1, wherein the head is configured to effectively dispense gaseous and/or powdered substances within the furnace.

4. The injector according to claim 1, wherein the head comprises a central nozzle.

5. The injector according to claim 4, wherein the central nozzle is a De Laval nozzle, suitable to output a supersonic flow.

6. The injector according to claim 4, wherein the central nozzle is suitable to inject powders that are pneumatically carried with a gaseous means.

7. The injector according to claim 1, wherein the head comprises a plurality of toroidal chambers that are co-axially arranged relative to each other.

8. The injector according to claim 7, wherein the toroidal chambers are co-axially arranged relative to the central nozzle.

9. The injector according to claim 7, wherein each of the toroidal chambers comprises a plurality of supply orifices suitable to feed a flow of gas and/or powders into the furnace.

10. The injector according to claim 9, wherein the supply orifices are suitable to emit a flow in the vicinity of the flow emitted by the central nozzle.

11. The injector according to claim 9, wherein the supply orifices are suitable to emit a flow at higher speed than that of the flow emitted by the central nozzle.

12. The injector according to claim 1, wherein the head comprises a cooling circuit suitable to contain the circulation of a cooling liquid.

13. The injector according to claim 1, wherein the body comprises collectors for supplying the toroidal chambers of the head.

14. The injector according to claim 1, further comprising connections to the supply circuit of the central nozzle.

15. The injector according to claim 1, further comprising connections to the supply circuit of the toroidal chambers.

16. The injector according to claim 1, further comprising connections to the supply circuit of the cooling circuit of the head.

17. The injector according to claim 1, wherein the head and body are made of two materials having different hardness values.

18. The injector according to claim 17, wherein the material composing the body is harder than the material composing the head.

19. The injector according to claim 1, wherein the removable connection means are suitable to define a constraint condition between the head and body, and are suitable to pass, for a preset indefinite number of times, from this constraint condition to a release condition.

20. The injector according to claim 1, wherein the removable connection means comprise a plurality of bolts.

21. The injector according to claim 1, wherein the removable connection means comprise a screw-nutscrew coupling in the central area of the injector.

22. The injector according to claim 21, wherein the screw-nutscrew coupling is placed about the central nozzle.

23. The injector according to claim 1, wherein the ridges have a triangular or cusp-like shape, preferably double.

24. The injector according to claim 1, wherein the contact surface between the body and head is substantially restrained to the line being defined by the vertex of the ridges on the flat tracks.

25. The injector according to claim 1, wherein the ridges are suitable to define closed regions.

26. The injector according to claim 25, wherein the closed regions are concentric to each other.

27. The injector according to claim 25, wherein the closed regions are sealed relative to each other and relative to the external environment.

28. The injector according to claim 25, wherein lumens are comprised within the closed regions, which connect the collectors of the body and the toroidal chambers of the head.

29. The injector according to claim 1, wherein a gasket is placed between the head and body.

* * * * *